United States Patent
Kawashimo (10) Patent No.: US 9,761,200 B2
(45) Date of Patent: Sep. 12, 2017

(54) CONTENT OUTPUT SYSTEM, CONTENT OUTPUT APPARATUS, CONTENT OUTPUT METHOD, AND COMPUTER-READABLE MEDIUM

(71) Applicant: CASIO COMPUTER CO., LTD., Shibuya-ku, Tokyo (JP)

(72) Inventor: Takashi Kawashimo, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/559,484

(22) Filed: Dec. 3, 2014

(65) Prior Publication Data

US 2015/0179144 A1   Jun. 25, 2015

(30) Foreign Application Priority Data

Dec. 19, 2013   (JP) .................. 2013-262658

(51) Int. Cl.
| | |
|---|---|
| *G06F 13/14* | (2006.01) |
| *G09G 5/12* | (2006.01) |
| *G09G 5/00* | (2006.01) |
| *G06Q 30/02* | (2012.01) |
| *H04N 21/414* | (2011.01) |
| *H04N 21/81* | (2011.01) |
| *H04N 21/2743* | (2011.01) |

(52) U.S. Cl.
CPC ........... *G09G 5/12* (2013.01); *G06Q 30/0241* (2013.01); *G09G 5/003* (2013.01); *H04N 21/2743* (2013.01); *H04N 21/41415* (2013.01); *H04N 21/812* (2013.01); *G09G 2320/08* (2013.01); *G09G 2320/10* (2013.01); *G09G 2370/06* (2013.01); *G09G 2370/16* (2013.01); *G09G 2380/04* (2013.01)

(58) Field of Classification Search
None
See application file for complete search history.

(56) References Cited

U.S. PATENT DOCUMENTS

2003/0160826 A1\* 8/2003 Tran ............... G01B 31/318314
                                                       715/771
2004/0237052 A1\* 11/2004 Allport ........... H04N 21/42228
                                                       715/840

(Continued)

FOREIGN PATENT DOCUMENTS

JP        2011150221 A      8/2011

OTHER PUBLICATIONS

Extended European Search Report dated Jun. 8, 2015, issued in counterpart European Application No. 14196857.8.

*Primary Examiner* — Frank Chen
(74) *Attorney, Agent, or Firm* — Holtz, Holtz & Volek PC (57) ABSTRACT

A commercial product configured to detect operation to the commercial product and to transmit the detected result, and a digital signage including a signage board configured to output visual content, a content storing unit which stores visual content corresponding to each of a plurality of kinds of operation of the commercial product, a communication unit configured to receive a result of detection from a transmission unit of a detection apparatus, a CPU configured to read corresponding visual content from the storing unit based on the received result of the detection and to make the signage board output the read visual content are included.

10 Claims, 5 Drawing Sheets

(56) References Cited

U.S. PATENT DOCUMENTS

| | | |
|---|---|---|
| 2005/0086695 A1 | 4/2005 | Keele et al. |
| 2006/0062382 A1* | 3/2006 | Ronkainen .......... G06F 3/04895 379/433.06 |
| 2008/0154610 A1* | 6/2008 | Mahlbacher ........... G08C 17/02 704/275 |
| 2009/0106081 A1* | 4/2009 | Burgess ................. G06Q 30/02 705/14.41 |
| 2009/0285483 A1 | 11/2009 | Guven et al. |
| 2010/0118200 A1 | 5/2010 | Gelman et al. |
| 2012/0075101 A1 | 3/2012 | Austin et al. |
| 2014/0032327 A1* | 1/2014 | Prakash ............. G06Q 30/0251 705/14.64 |
| 2014/0082701 A1* | 3/2014 | Pasion .................... G06F 21/10 726/4 |

* cited by examiner

CONTENT OUTPUT SYSTEM, CONTENT OUTPUT APPARATUS, CONTENT OUTPUT METHOD, AND COMPUTER-READABLE MEDIUM

BACKGROUND

1. Technical Field

An embodiment of the present invention relates, for example, to a content output system, a content output apparatus, a content output method, and a computer-readable medium which are suitable for a store or the like to display a commercial product.

2. Related Art

In order to improve an effect of a displayed commercial product or the like to a viewer, a technique of a visual image output apparatus to project visual content on a screen formed in a contour shape of the content itself when detecting approach of a person with a motion sensor has been proposed (see, for example, JP 2011-150221 A).

SUMMARY

In the technique described in JP 2011-150221 A, there is a trouble that visual content which can be projected is limited since a screen itself is formed in a contour shape of the visual content.

Also, in JP 2011-150221 A, only detection approach of a viewer and output of visual content are performed. Thus, even in a case where a viewer seems to have an interest in a specific commercial product, such as a case where the viewer actually holds the commercial product, it is not possible to output visual content which matches the case.

The present invention has been made in view of the forgoing condition and is to output various kinds of visual content in response to operation to a commercial product.

In an aspect of the present invention, a detection apparatus including a detection unit configured to detect operation to a commercial product and a transmission unit configured to transmit a result of the detection in the detection unit, and a content output apparatus including a content output unit configured to output a visual content, a reception unit configured to receive the result of the detection from the transmission unit of the detection apparatus, and a content output controlling unit configured to make the content output unit output visual content based on the result of the detection received in the reception unit are included.

According to an embodiment of the present invention, it becomes possible to output various kinds of visual content in response to operation to a commercial product.

DETAILED DESCRIPTION

Figure 1:
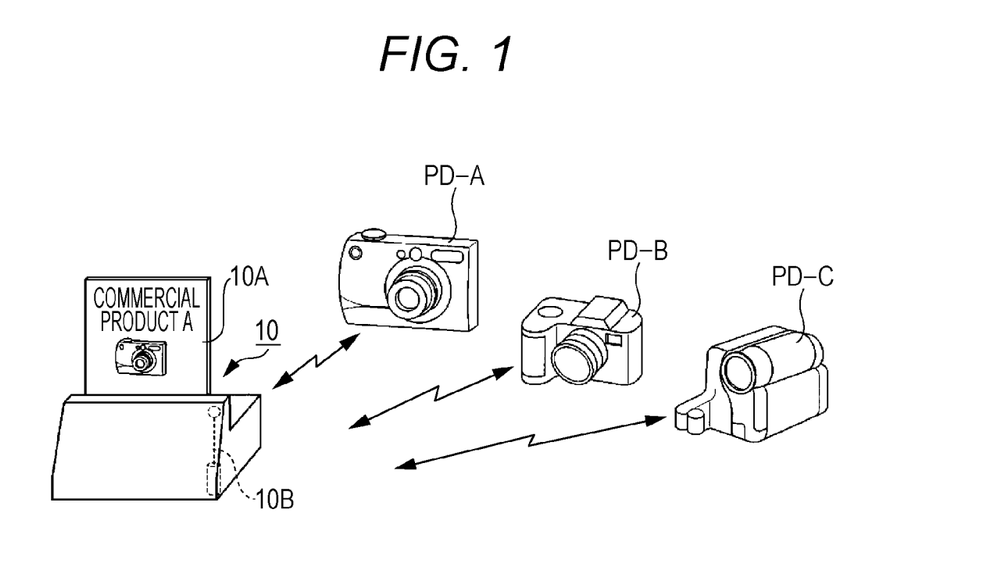
FIG. 1 is a view illustrating an outer appearance configuration of a system as a whole according to an embodiment of the present invention.

In the following, an embodiment of when the present invention is applied to a content output system provided in a store will be described in detail with reference to the drawings. FIG. 1 is a view illustrating an outer appearance configuration of a system as a whole according to the present embodiment. A digital signage 10 as a content output apparatus is provided near commercial products PD-A, PD-B, and PD-C as displayed commercial products. Here, a case where the commercial product PD-A is a compact-type digital camera, the commercial product PD-B is a single-lens-reflex-type digital camera, and the commercial product PD-C is a video movie camera in a camera section in a store of electrical goods is illustrated as an example.

Each of the commercial products PD-A, PD-B, and PD-C also functions as a detection apparatus during displaying of the commercial products. When each apparatus is handled by a customer or the like and certain function operation is performed, operation command information is generated from a model code and an operation code of the commercial product and is transmitted in a manner, for example, of a Bluetooth (registered trademark) standard which is a near field communication technique.

On the other hand, in the digital signage 10, a translucent tabular signage board 10A is erected on an upper front surface side of a housing. For example, visual content related to an operated commercial product (such as commercial product PD-A) is projected and displayed by a rear-projection-type projection mechanism.

Also, in the digital signage 10, a communication unit 10B to receive information from a communication tag is embedded.

FIG. 1 is a view illustrating a state in which the commercial product PD-A is held and operated by a customer (not illustrated) and visual content related to the commercial product PD-A is displayed on the signage board 10A of the digital signage 10 by the operation.

Here, it is assumed that matching processing is performed previously in respect to the digital signage 10 and the commercial products PD-A, PD-B, and PD-C by the Bluetooth (registered trademark) technique with the digital signage 10 as a master device, and each of the commercial products PD-A, PD-B, and PD-C is a slave device.

Figure 2:
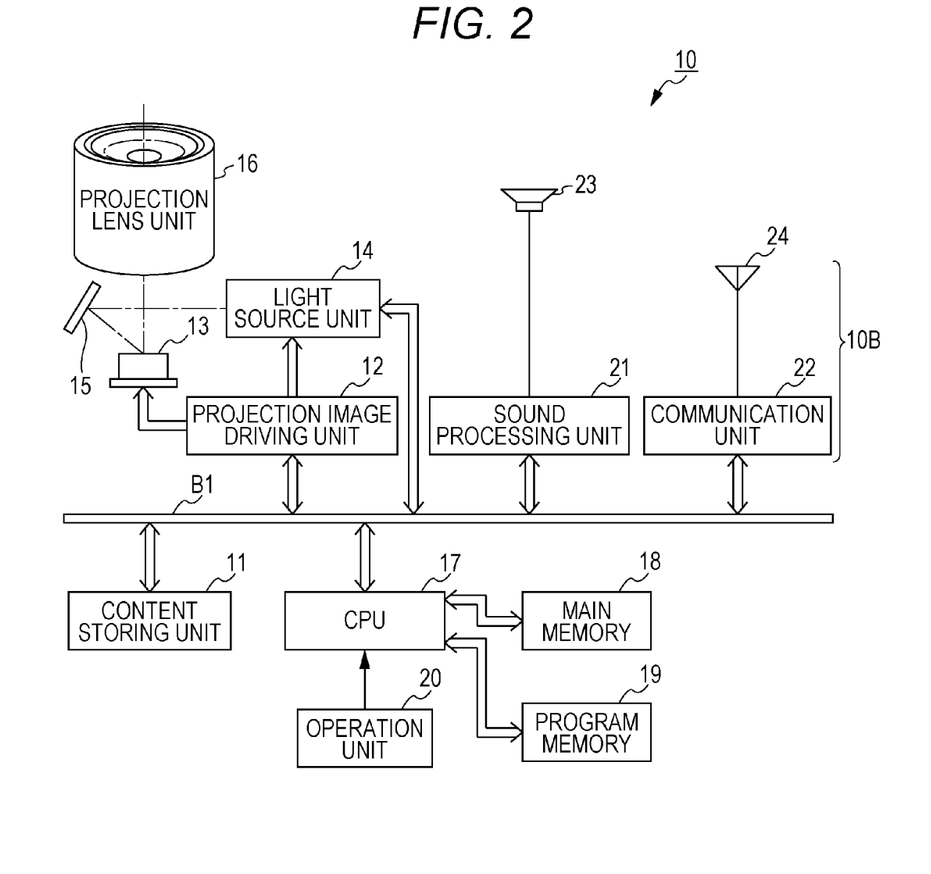
FIG. 2 is a block diagram for describing a function configuration of an electronic circuit of a digital signage according to the embodiment.

FIG. 2 is a view for describing a function configuration mainly of an electronic circuit of the digital signage 10. In FIG. 2, image data as visual content is read from a content storing unit 11 and is transmitted to a projection image driving unit 12 through a bus B1.

Into the content storing unit 11, data in which detail information or the like related, for example, to a function corresponding to each kind of operation of a model of each of the commercial products PD-A, PD-B, and PD-C is made into visual content or sound content is stored.

In addition, into the content storing unit 11, the most recommended function such as a high-speed shooting function, special image tone conversion processing, or high dynamic range composition processing is registered for a model of each of the commercial products PD-A, PD-B, and PD-C and visual content information for description of a function in the recommended function is recorded.

The projection image driving unit 12 performs display driving of a micromirror element 13 which is a display element by faster time-division driving, in which a frame rate in a predetermined format such as 120 frame/second, the number of divisions of a color component, and the number of display gradations are multiplied by each other, according to the transmitted image data.

The micromirror element 13 performs display operation by performing on/off operation, at a high-speed, of an inclination angle of each of a plurality of micromirrors arranged in an array, for example, of WXGA (1280 pixels× 768 pixels), and thus, an optical image is formed by reflection light therefrom.

On the other hand, from the light source unit 14, light having primary colors which are R, G, and B are emitted cyclically in time-division. The light source unit 14 includes an LED which is a semiconductor light-emitting element and emits the plight having primary colors which are R, G, and B repeatedly in time-division. As an LED in a broad sense, the LED included in the light source unit 14 may include a semiconductor laser (LD) or an organic EL element.

Light having a primary color and a wavelength different from that of the original light may be used, the light being excited by emission of the light, which is emitted from the LED, to a phosphor. The light having a primary color transmitted from the light source unit 14 is totally reflected by a mirror 15 and is emitted to the micromirror element 13.

Then, an optical image is formed from the reflection light on the micromirror element 13 and the formed optical image is emitted to an outer part through a projection lens unit 16.

A CPU 17 controls whole operation in each circuit described above. The CPU 17 is directly connected to a main memory 18 and a program memory 19. The main memory 18 includes, for example, an SRAM and functions as a work memory of the CPU 17. The program memory 19 includes an electrically-rewritable non-volatile memory such as a flash ROM and stores an operation program executed by the CPU 17, various format data, and the like.

The CPU 17 integrally controls the digital signage 10 by reading the operation program, the format data, or the like stored in the program memory 19, expanding and storing the read program in the main memory 18, and executing the program.

The CPU 17 executes various kinds of projection operation according to an operation signal from an operation unit 20. The operation unit 20 receives a key operation signal of some operation keys, which include a power key and which are included in a main body of the digital signage 10, and transmits a signal corresponding to received operation to the CPU 17.

Moreover, the CPU 17 is connected to a sound processing unit 21 and a communication unit 22 through the bus B1. The sound processing unit 21 includes a sound source circuit such as a PCM sound source. The sound processing unit 21 converts a sound signal provided during the projection operation into an analog signal, and drives and makes a speaker unit 23 emit sound, or a beep sound and the like when necessary.

The communication unit 22 and an antenna 24 configure the communication unit 10B. The communication unit 22 receives information from the commercial products PD-A, PD-B, and PD-C.

Figure 3:
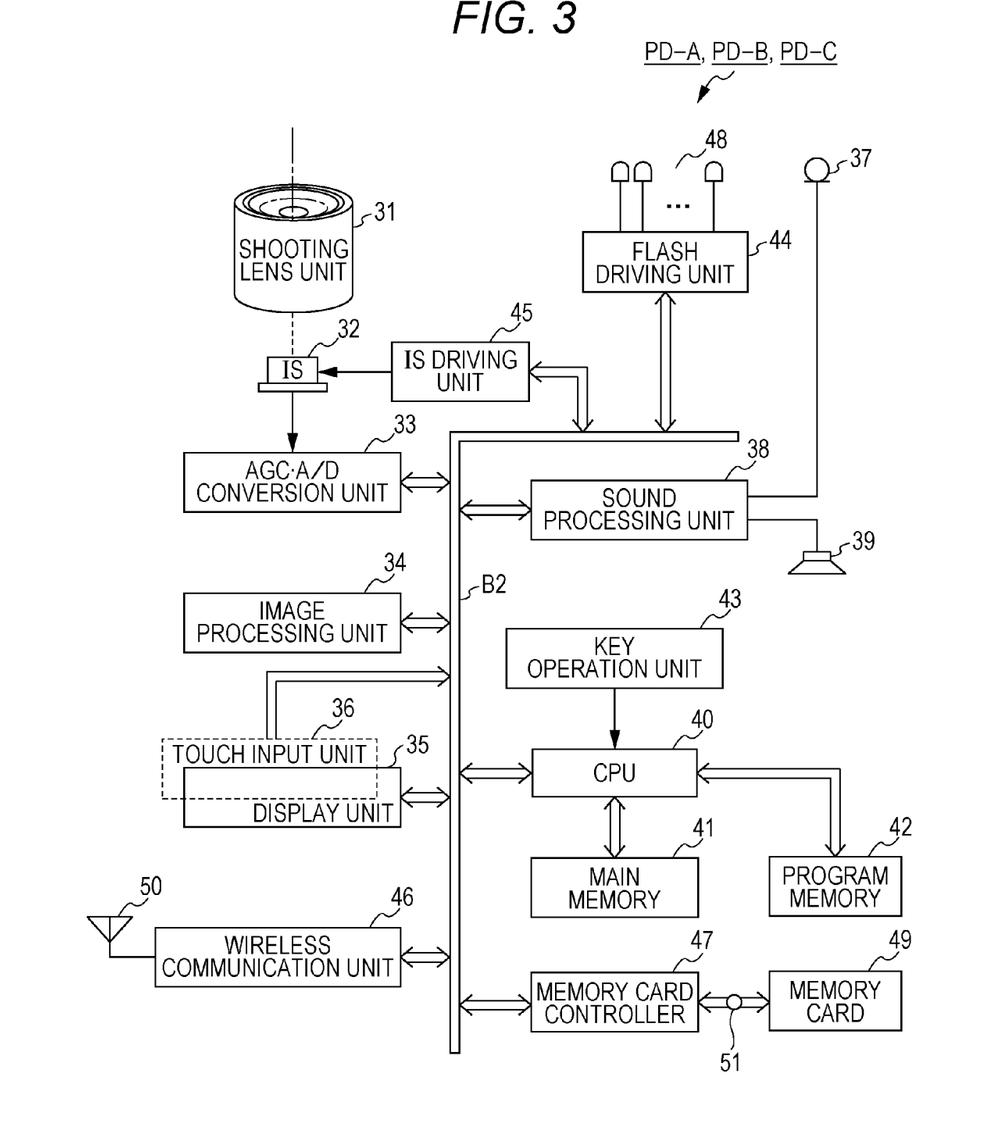
FIG. 3 is a block diagram illustrating a concept configuration of a basic electronic circuit common to a digital camera according to the embodiment.

Next, a concept configuration of a basic electronic circuit as a digital camera which is common to the commercial products PD-A, PD-B, and PD-C is illustrated in FIG. 3.

FIG. 3 is a view illustrating a circuit configuration of the digital camera (PD-A, PD-B, and PD-C). In FIG. 3, an optical image of an object becomes incident and is formed on an imaging surface of a solid-state imaging element such as a CMOS image sensor (IS) 32 through a shooting lens unit 31 arranged on a front surface of a camera housing.

In a monitor state referred to as a through-image display or a live view image display, an image signal acquired by the imaging performed by the CMOS image sensor 32 is transmitted to an AGC•A/D conversion unit 33. The AGC•A/D conversion unit 33 digitalizes the analog image signal by executing correlated double sampling, automatic gain adjustment, or A/D conversion processing. An image data of the digital value is transmitted to an image processing unit 34 through a bus B2.

The image processing unit 34 arbitrarily performs necessary image processing on the image data. That is, in the image processing unit 34, the image data (hereinafter, referred to as "RAW data") corresponding to a configuration of a color filter in the Bayer array which filter is included in the CMOS image sensor 32 is converted into luminance color difference (YUV) image data by execution of digital development processing, specifically, by execution of demosaic processing such as pixel interpolation processing, gamma correction, or matrix operation.

The image processing unit 34 generates image data, in which the number of pixels and gradation bits is greatly reduced, for displaying, from the image data after development, and transmits the generated image data to a display unit 35 through the bus B2. The display unit 35 displays a through-image based on the transmitted image data.

The display unit 35 is provided on a rear surface side of the camera housing and includes, for example, a color liquid crystal panel with backlight and a controller thereof. On an upper part of a screen of the display unit 35, a touch input unit 36 including a transparent conductive film is configured integrally.

When a user performs touch operation with a finger or the like on a surface of the touch input unit 36, the touch input unit 36 calculates an operated coordinate position and transmits a calculated coordinate signal to a CPU 40 through the bus B2.

Also, similarly to the shooting lens unit 31, a microphone 37 is arranged on the front surface of the camera housing and sound in an object direction is input. The microphone 37 converts the input sound into an electric signal and outputs the electric signal to a sound processing unit 38.

The sound processing unit 38 digitalizes the sound signal input from the microphone 37 during recording of sound, shooting of a still image with sound, and shooting of a dynamic image. Moreover, while detecting a sound pressure level of the digitalized sound data, the sound processing unit 38 generates a sound data file by performing data compression of the sound data in a predetermined data file format such as a moving picture experts group-4 Advanced Audio Coding (AAC) format, and transmits the generated sound data file to a recording medium which will be described later.

In addition, the sound processing unit 38 includes a sound source circuit such as a PCM sound source. The sound processing unit 38 decompresses the sound data file transmitted during reproduction of sound and converts the sound data file into an analog file. Then, the sound processing unit 38 drives and makes a speaker 39 emit sound, the speaker 39 being provided on the rear surface side of the camera housing.

The CPU 40 integrally controls the above circuits. The CPU 40 is directly connected to a main memory 41 and a program memory 42. The main memory 41 includes, for example, an SRAM and functions as a work memory. The program memory 42 includes, for example, an electrically-rewritable non-volatile memory such as a flash memory and stores various operation programs, various kinds of data, and the like in a fixed manner.

The CPU 40 executes control operation of the camera as a whole while reading a necessary program, data, or the like from the program memory 42 and arbitrarily and temporarily expanding and storing the program, data, or the like in the main memory 41.

Moreover, the CPU 40 executes control operation according to various key operation signals directly input from a key operation unit 43 and a coordinate signal corresponding to touch operation on the touch input unit 36.

The key operation unit 43 includes, for example, a power key, a shutter releasing key, a zoom up/down key, a shooting mode key, a reproduction mode key, a menu key, cursor ("↑", "→", "↓,", and "←") keys, a set key, a release key, and a display key.

The CPU 40 is connected, through the bus B2, not only to the above-described AGC•A/D conversion unit 33, image processing unit 34, display unit 35, touch input unit 36, and sound processing unit 38 but also a flash driving unit 44, an image sensor (IS) driving unit 45, a wireless communication unit 46, and a memory card controller 47.

The flash driving unit 44 receives a control signal from the CPU 40 during the shooting of a still image, synchronizes a flash unit 48, which includes a plurality of high-luminance white LEDs, with shooting timing, and performs lighting driving thereof.

The image sensor driving unit 45 performs scanning driving of the CMOS image sensor 32 according to a shooting condition or the like set at the time.

The image processing unit 34 performs demosaic processing of the image data transmitted from the AGC•A/D conversion unit 33 during shooting of an image in response to shutter releasing key operation in the key operation unit 43. In addition, when the image data is in a predetermined image data file format such as a joint photographic experts group (JPEG), data compression processing such as discrete cosine transform (DCT) or Huffman coding is performed and an image data file in which a data volume is greatly reduced is generated. The created image data file is transferred and stored into a memory card 49 through the bus B2 and the memory card controller 47.

Also, the image processing unit 34 receives, through the bus B2, image data read from the memory card 49 through the memory card controller 47 in a reproduction mode. The image processing unit 34 acquires an image data of an original size by expansion processing to decompress the received image data in an order opposite of that in the recording, reduces a data volume of the acquired image data, and displays the acquired image data on the data display unit 35 through the bus B2.

The wireless communication unit 46 generates an operation command code by combining an operation code corresponding to operation in the key operation unit 43 or on the touch input unit 36 with a model code of the camera, and transmits the operation command code to the digital signage 10 through an antenna 50.

The memory card controller 47 is connected to the memory card 49 mounted to a card connector 51. The memory card 49 is mounted to the camera in a removable manner and is a memory for recording an image file or the like, the memory being a recording medium of the camera. In an inner part of the memory card 49, a flash memory, which is a non-volatile memory, and a driving circuit thereof are provided.

Next, operation of the above-described embodiment will be described. First, in FIG. 4, processing contents on a side of the commercial products PD-A, PD-B, and PD-C are illustrated. In the processing, the CPU 40 of each of the commercial products PD-A, PD-B, and PD-C expands and executes an operation program, which is read from the program memory 42, on the main memory 41.

Figure 4:
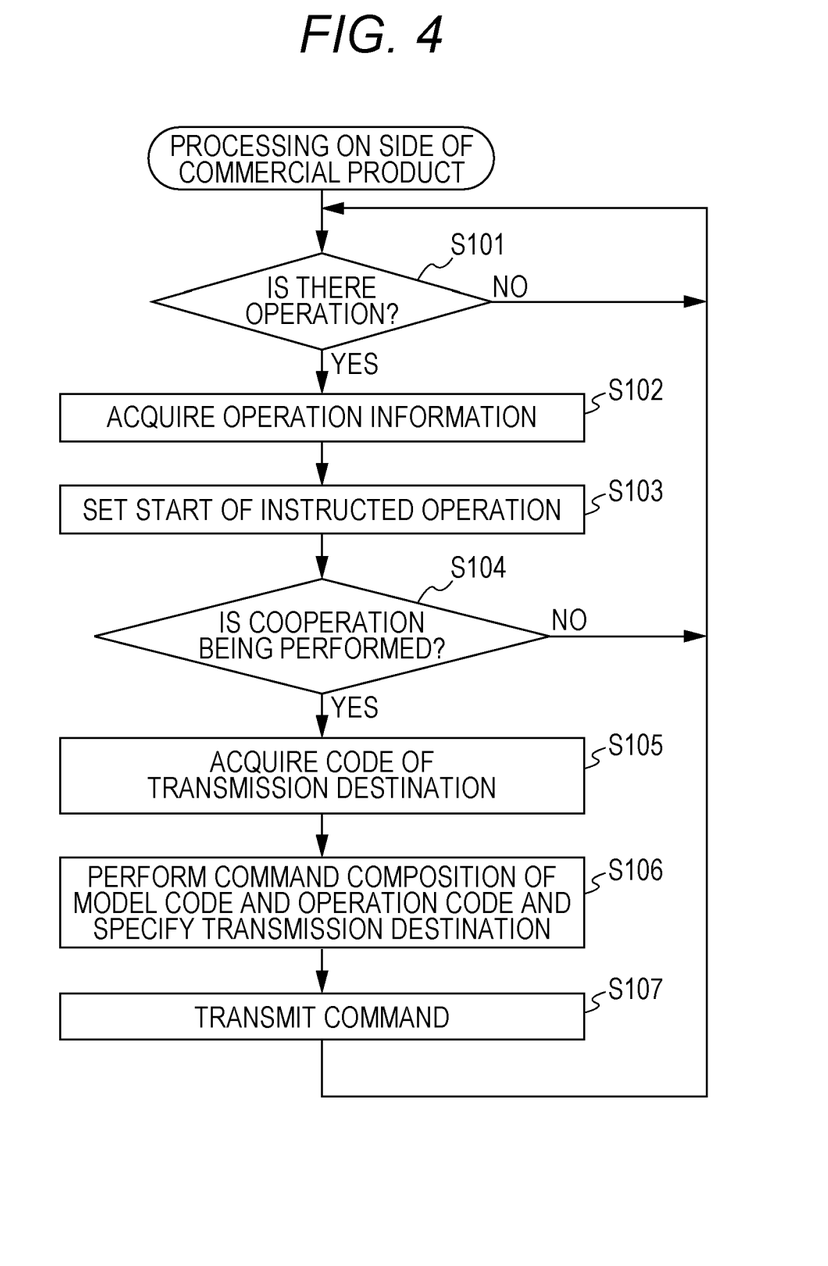
FIG. 4 is a flowchart illustrating processing contents executed by a CPU of the digital camera according to the embodiment.

In the beginning of the processing, the CPU 40 repeatedly determines whether there is operation in the key operation unit 43 or on the touch input unit 36 and waits until certain operation is performed (step S101).

Then, at a time point where it is determined that there is certain operation, instruction information operated in the operation as a digital camera is acquired from an operation signal thereof and an operation state at the time point (step S102). The CPU 40 performs setting in such a manner that instructed operation is started immediately according to the acquired instruction information (step S103).

While performing the setting to start the operation, the CPU 40 determines whether cooperative operation with the side of the digital signage 10 is performed at the time point based on determination whether it is possible to recognize the digital signage 10, which is the master device, through the wireless communication unit 46 and the antenna 50 (step S104).

Here, when it is determined that the cooperative operation is not performed and it is not possible to recognize, as the master device, the side of the digital signage 10 with which matching processing is supposed to be performed, processing for the cooperative operation with the side of the digital signage 10 is stopped and processing goes back to step S101 for preparation for next operation.

Also, when it is determined in step S104 that the cooperative operation with the side of the digital signage 10 is performed and that it is possible to recognize the digital signage 10 which is the master device, the CPU 40 acquires code information of the digital signage 10 in a transmission destination (step S105). Then, the CPU 40 generates operation command information by using a model code of the own device and the operation code acquired in step S102 and specifies code information of the digital signage 10 as the transmission destination (step S106). The operation command information generated in such a manner is transmitted to the digital signage 10 (step S107). With the above, processing for transmitting a command to the digital signage 10 in response to instruction operation on the side of the commercial products PD-A, PD-B, and PD-C is ended once and processing goes back to step S101 for preparation for next operation.

Figure 5:
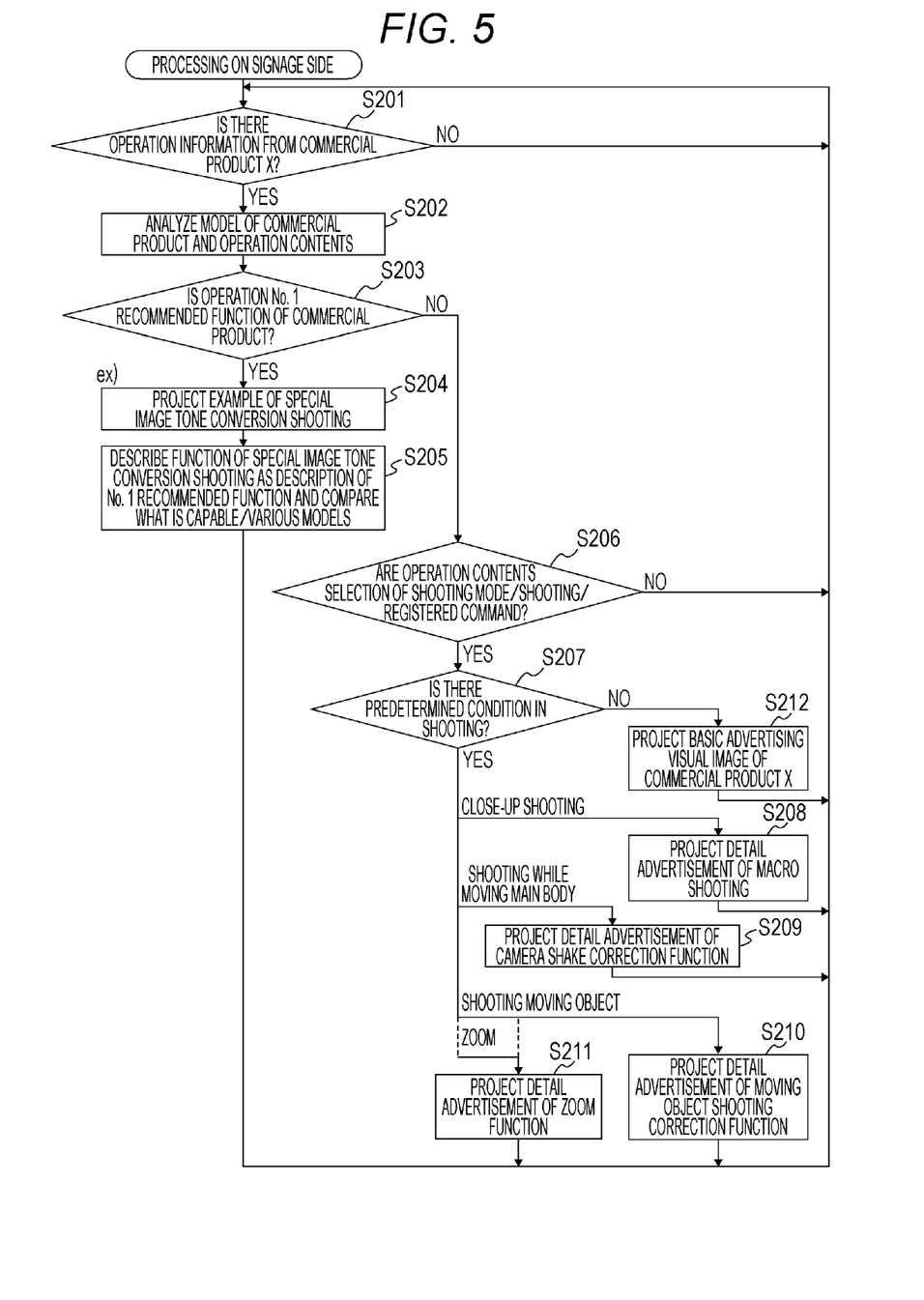
FIG. 5 is a flowchart illustrating processing contents executed by a CPU of the digital signage according to the embodiment.

Next, processing on the side of the digital signage 10 which receives the operation command information will be described. In FIG. 5, contents of projection processing in response to the operation command information from the commercial products PD-A, PD-B, and PD-C is illustrated. In the processing, the CPU 17 expands and executes an operation program, which is read from the program memory 19, on the main memory 18.

In the beginning of the processing, the CPU 17 repeatedly determines whether operation command information is received from any of the commercial products PD-A, PD-B, and PD-C through the communication unit 10B including the communication unit 22 and the antenna 24 and waits for an arrival of the operation command information (step S201).

Then, at a time point where it is determined in step S201 that the operation command information is received, the CPU 17 analyzes a model code and an operation code of a transmission side from the received operation command information (step S202).

According to a result of the analysis, the CPU 17 determines whether the operation is operation corresponding to the most recommended function in the model (step S203).

Here, a case where the most recommended function in the model is, for example, special image tone conversion to convert a shot image into a painterly image will be described as an example. When it is determined in step S203 that the operation code is that of operation to instruct the most recommended function in the model, the CPU 17 reads, from the content storing unit 11, image data as a shooting example in the special image tone conversion by the recommended function and transmits the read image data to the projection image driving unit 12, generates a corresponding optical image on the micromirror element 13, and projects the generated optical image on the signage board 10A with the projection lens unit 16 (step S204).

Then, the CPU 17 projects, as description for the most recommended function in the model, description of the shooting function in the special image tone conversion along with a demonstration image or the like for a certain period of time by using a dynamic image read from the CPU 17 (step S205).

Also, here, the CPU 17 may determine whether there is operation in a different model including a similar recommended function within a certain period of time such as 60 seconds. When it is determined that there is the operation, visual content information to compare similar recommended functions of the plurality of models may be generated and projected.

After the projection operation in step S205 is performed for a certain period of time, the CPU 17 ends the projection operation once to prepare for next operation in the commercial products PD-A, PD-B, and PD-C and goes back to the waiting processing in step S201.

Also, when it is determined that the contents operated in step S203 is not operation corresponding to the most recommended function in the model, the CPU 17 determines whether the operated contents are operation for shooting by selection of a shooting mode or shutter releasing key operation, or operation to which corresponding visual content is registered previously (step S206).

Here, when it is determined that the operated contents are not the operation to which corresponding visual content is registered previously, there is no visual content to be projected in the content storing unit 11. Thus, for preparation for next operation in the commercial products PD-A, PD-B, and PD-C, processing goes back to the waiting processing in step S201.

Also, when it is determined in step S206 that the operated contents are the operation to which corresponding visual content is registered previously, the CPU 17 selects visual content to be projected by selecting a specific shooting time or a predetermined condition (step S207).

Here, it is assumed that visual content is registered for cases, for example, of "close-up shooting", "shooting while moving a main body", "shooting a moving object", . . . and "zoom shooting" and selection therefrom is performed.

When it is determined in step S207 that the "close-up shooting" is selected, the CPU 17 reads, from the content storing unit 11, visual content for a detail advertisement related to macro shooting in the commercial product and transmits the read visual content to the projection image driving unit 12. Then, after generating a corresponding optical image on the micromirror element 13 and projecting the generated optical image on the signage board 10A for a certain period of time with the projection lens unit 16 (step S208), the CPU 17 goes back to the waiting processing in step S201 in order to prepare for next operation.

Also, when it is determined in step S207 that the "shooting while moving a main body" is selected, the CPU 17 reads, from the content storing unit 11, visual content for a detail advertisement related to a camera shake correction function of the commercial product and transmits the read visual content to the projection image driving unit 12. Then, after generating a corresponding optical image on the micromirror element 13 and projecting the generated optical image on the signage board 10A for a certain period of time with the projection lens unit 16 (step S209), the CPU 17 goes back to the waiting processing in step S201 in order to prepare for next operation.

Also, when it is determined in step S207 that the "shooting a moving object" is selected, the CPU 17 reads, from the content storing unit 11, visual content for a detail advertisement related to a shooting correction function, for a moving object (such as animal, child, or vehicle), of the commercial product and transmits the read visual content to the projection image driving unit 12. Then, after generating a corresponding optical image on the micromirror element 13 and projecting the generated optical image on the signage board 10A for a certain period of time with the projection lens unit 16 (step S210), the CPU 17 goes back to the waiting processing in step S201 in order to prepare for next operation.

Moreover, when it is determined in step S207 that the "zoom shooting" is selected, the CPU 17 reads, from the content storing unit 11, visual content for a detail advertisement related to a zoom function of the commercial product and transmits the read visual content to the projection image driving unit 12. Then, after generating a corresponding optical image on the micromirror element 13 and projecting the generated optical image on the signage board 10A for a certain period of time with the projection lens unit 16 (step S211), the CPU 17 goes back to the waiting processing in step S201 in order to prepare for next operation.

Note that when it is determined in step S207 that a shooting time or a predetermined condition is not specified, the CPU 17 reads, from the content storing unit 11, visual content for a basic advertisement of a model of the commercial product and transmits the read visual content to the projection image driving unit 12. Then, after generating a corresponding optical image on the micromirror element 13 and projecting the generated optical image on the signage board 10A for a certain period of time with the projection lens unit 16 (step S212), the CPU 17 goes back to the waiting processing in step S201 in order to prepare for next operation.

As described above, according to the present embodiment, it is possible to output various kinds of visual content in response to operation to the commercial products PD-A, PD-B, and PD-C.

Also, in the above embodiment, visual content corresponding to each of a plurality of commercial products is stored in the content storing unit 11 and determination of a commercial product is performed according to a model code in command information transmitted from the commercial product. Thus, even when a plurality of models of commercial products is mixed and displayed, it is possible to output appropriate visual content according to a model of an operated commercial product.

Moreover, in the present embodiment, when operation corresponding to the most recommended function in the model is performed, at least one of visual content to describe the function and visual content to perform comparison with a commercial product of a different model in respect to the function is output. Thus, advertising effectiveness can be further improved.

Note that in the above embodiment, a case where visual content is output in respect to contents operated in each commercial product has been described. However, visual content in which a function different from the actually-operated contents such as a recommended unique function of the model is associated with the operated function may be daringly output.

In addition, the present invention is not limited to the above-described embodiment and can be modified in various ways within the spirit thereof in a practical phase. Also, functions executed in the above-described embodiment may be arbitrarily combined and performed when possible. The above-described embodiment includes various stages, and various inventions can be extracted by arbitrarily combining a plurality of disclosed components. For example, when some components are removed from all components illustrated in the embodiment, a configuration from which the components are removed can be extracted as an invention as long as an effect can be acquired.

What is claimed is:

1. A content output system comprising:
    a commercial product which functions as a detection apparatus, the commercial product comprising:
        a first storage which stores a plurality of predetermined functional operations which are performable by the commercial product; and
        a first processor which is configured to:
            receive an instruction from a user to perform at least one functional operation from among the plurality of predetermined functional operations which are performable by the commercial product;
            control the commercial product to perform the at least one functional operation in accordance with the received instruction;
            perform a detection operation, which is different from the functional operation itself, to detect the functional operation performed by the commercial product in accordance with the received instruction, and generate operation command information which identifies the detected functional operation performed by the commercial product; and
            perform control to transmit the operation command information which identifies the detected functional operation; and
    a content output apparatus including:
        a display which is configured to output visual content;
        a second storage which stores a plurality of visual contents each explaining a respective one of the plurality of the predetermined functional operations which are performable by the commercial product; and
        a second processor which is configured to:
            receive the operation command information transmitted from the detection apparatus, and
            perform a display control operation, which is different from the functional operation performed by the commercial product, to control the display to output a visual content which is related to the detected functional operation identified by the received operation command information, from among the plurality of visual contents stored in the second storage.

2. The content output system according to claim 1, wherein:
    the commercial product comprises a plurality of commercial products,
    the first processor is provided to each of the plurality of commercial products and generates the operation command information to include model information corresponding to the commercial product to which the first processor is provided, and performs control to transmit the operation command information which identifies the detected functional operation and which includes the model information of the corresponding commercial to which the first processor is provided,
    the second storage of the content output apparatus stores output visual contents each explaining a respective one of the plurality of functional operations which are performable by the plurality of commercial products, and
    the second processor of the content output apparatus reads, from the second storage, a visual content corresponding to a commercial product and an operation based on the received operation command information and performs control to cause the display to output the read visual content.

3. The content output apparatus according to claim 2, wherein the second storage stores, in respect to operation of a function which is set as a recommendation in each of the commercial products, visual content to describe the function.

4. The content output apparatus according to claim 2, wherein the second storage stores, in respect to operation of a function which is set as a recommendation in each of the commercial products, visual content to perform a comparison with a commercial product of a different model in respect to the function.

5. The content output apparatus according to claim 1, wherein the second storage stores, in respect to operation of a function which is set as a recommendation in the commercial product, visual content to describe the function.

6. The content output apparatus according to claim 1, wherein the second storage stores, in respect to operation of a function which is set as a recommendation in the commercial product, visual content to perform a comparison with a commercial product of a different model in respect to the function.

7. The content output system according to claim 1, wherein the first processor generates the operation command information by combining a model code identifying the commercial product and an operation code identifying the detected functional operation.

8. A content output apparatus comprising:
    a first processor;
    a display which is configured to output visual content; and
    a first storage which stores a plurality of visual contents each explaining a respective one of a plurality of predetermined functional operations which are performable by a commercial product, wherein the commercial product functions as a detection apparatus and comprises (A) a second storage which stores the plurality of the predetermined functional operations which are performable by the commercial product, and (B) a second processor which is configured to: (i) receive an instruction from a user to perform at least one functional operation from among the plurality of predetermined functional operations which are performable by the commercial product, (ii) control the commercial product to perform the at least one functional operation in accordance with the received instruction, (iii) perform a detection operation, which is different from the functional operation itself, to detect the functional operation performed by the commercial product in accordance with the received instruction, and generate operation command information which identifies the detected functional operation performed by the commercial product, and (iv) perform control to transmit the operation command information which identifies the detected functional operation;

wherein the first processor of the content output apparatus is configured to:

receive the operation command information transmitted from the detection apparatus; and perform a display control operation, which is different from the functional operation performed by the commercial product, to control the display to output a visual content which is related to the detected functional operation identified by the received operation command information, from among the plurality of visual contents stored in the first storage.

9. A content output method for a content output system which includes (A) a commercial product which functions as a detection apparatus and which comprises (i) a first storage which stores a plurality of predetermined functional operations which are performable by the commercial product, and (ii) a first processor, and (B) a content output apparatus which comprises (i) a second storage which stores a plurality of visual contents each explaining a respective one of the plurality of the predetermined functional operations which are performable by the commercial product, (ii) a second processor, and (iii) a display configured to output the visual content, the method comprising:

receiving, by the first processor of the commercial product, an instruction from a user to perform at least one functional operation from among the plurality of predetermined functional operations which are performable by the commercial product;

controlling, by the first processor of the commercial product, the commercial product to perform the at least one functional operation in accordance with the received instruction;

performing, by the first processor of the commercial product, a detection operation, which is different from the functional operation itself, to detect the functional operation performed by the commercial product in accordance with the received instruction, and generate operation command information which identifies the detected functional operation performed by the commercial product;

performing, by the first processor of the commercial product, control to transmit the operation command information which identifies the detected functional operation;

receiving, by the second processor of the content output apparatus, the operation command information transmitted from the detection apparatus; and performing, by the second processor of the content output apparatus, a display control operation, which is different from the functional operation performed by the commercial product, to control the display to output a visual content which is related to the detected functional operation identified by the received operation command information, from among the plurality of visual contents stored in the second storage.

10. A non-transitory computer-readable recording medium storing at least one program executable by a computer of a commercial product and a computer of a content output apparatus, wherein the commercial product includes a first storage which stores a plurality of predetermined functional operations which are performable by the commercial product, and the content output apparatus includes a second storage which stores a plurality of visual contents each explaining a respective one of the plurality of the predetermined functional operations which are performable by the commercial product, and a display configured to output the visual content, wherein the at least one program causes the computer of the commercial product to execute functions comprising:

receiving an instruction from a user to perform at least one functional operation from among the plurality of predetermined functional operations which are performable by the commercial product;

controlling the commercial product to perform the at least one functional operation in accordance with the received instruction;

performing a detection operation, which is different from the functional operation itself, to detect the functional operation performed by the commercial product in accordance with the received instruction, and generate operation command information which identifies the detected functional operation performed by the commercial product; and performing control to transmit the operation command information which identifies the detected functional operation;

and wherein the at least one program causes the computer of the content output apparatus to execute functions comprising:

receiving the operation command information transmitted from the detection apparatus; and performed by the commercial product in accordance with a user's instruction and which and performing a display control operation, which is different from the functional operation performed by the commercial product, to control the display to output a visual content which is related to the detected functional operation identified by the received operation command information, from among the plurality of visual contents stored in the second storage.

* * * * *

UNITED STATES PATENT AND TRADEMARK OFFICE
CERTIFICATE OF CORRECTION

PATENT NO. : 9,761,200 B2  
APPLICATION NO. : 14/559484  
DATED : September 12, 2017  
INVENTOR(S) : Takashi Kawashimo Page 1 of 1

It is certified that error appears in the above-identified patent and that said Letters Patent is hereby corrected as shown below:

In the Claims

Column 12, Lines 47-48, after "and" delete "performed by the commercial product in accordance with a user's instruction and which and".

Signed and Sealed this  
Nineteenth Day of December, 2017

Joseph Matal  
*Performing the Functions and Duties of the*  
*Under Secretary of Commerce for Intellectual Property and*  
*Director of the United States Patent and Trademark Office*